United States Patent
Portaro et al.

[11] Patent Number: 5,946,617
[45] Date of Patent: Aug. 31, 1999

[54] CELLULAR COMMUNICATION SYSTEM WITH REMOTE POWER SOURCE FOR PROVIDING POWER TO ACCESS POINTS

[75] Inventors: James D. Portaro, Bruceton Mills, W. Va.; Thomas A. Baird, Cumberland, Md.

[73] Assignee: Telxon Corporation, Akron, Ohio

[21] Appl. No.: 08/672,429

[22] Filed: Jun. 28, 1996

[51] Int. Cl.⁶ .................................................. H04B 7/26
[52] U.S. Cl. .................... 455/422; 455/560; 455/572; 379/413
[58] Field of Search .................... 455/402, 127, 455/343, 561, 560, 572, 422; 379/307, 322, 324, 413

[56] References Cited

U.S. PATENT DOCUMENTS

| | | | |
|---|---|---|---|
| 4,803,719 | 2/1989 | Ulrich | 379/413 X |
| 4,984,267 | 1/1991 | Martinez | 379/324 X |
| 5,469,282 | 11/1995 | Ishioka | 379/413 X |
| 5,734,711 | 3/1998 | Kleffner | 379/413 |

FOREIGN PATENT DOCUMENTS 57-68985  4/1982  Japan .

*Primary Examiner*—Thanh Cong Le
*Attorney, Agent, or Firm*—Renner, Otto, Boisselle & Sklar, P.L.L.

[57] ABSTRACT

A cellular communication system which eliminates high costs and difficulties associated with providing electrical power to the access points. The cellular communication system includes a remote power source which obviates the need to install an AC power outlet in close proximity to each access point. The remote power source transforms AC power to DC power at a central remote location, and provides as its output one or more low voltage DC power lines. By performing the AC/DC power transformation at a central location, only the low voltage DC power lines need to be fed to each access point. The remote power source also includes a backup power supply feature and an alarm to draw attention to system malfunctions.

19 Claims, 3 Drawing Sheets

CELLULAR COMMUNICATION SYSTEM WITH REMOTE POWER SOURCE FOR PROVIDING POWER TO ACCESS POINTS

TECHNICAL FIELD

The present invention relates generally to cellular communication systems, and more particularly to a cellular communication system including a remote power source for providing power to access points within the system.

BACKGROUND OF THE INVENTION

In recent years, the use of cellular communication systems having mobile devices which communicate with a hardwired network, such as a local area network (LAN) or a wide area network (WAN), has become widespread. Retail stores and warehouses, for example, may use cellular communication systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographic regions while retaining telephonic access. Paging networks also may utilize cellular communication systems which enable a user carrying a pocket sized pager to be paged anywhere within a geographic region.

A typical cellular communication system includes a number of fixed access points (also known as base stations) interconnected by a cable medium often referred to as a system backbone. Also included in many cellular communication systems are intermediate access points which are not directly connected to the system backbone but otherwise perform many of the same functions as the fixed access points. Intermediate access points, often referred to as wireless access points or base stations, increase the area within which access points connected to the system backbone can communicate with mobile devices. Unless otherwise indicated, the term "access point" will hereinafter refer to both access points hardwired to the system backbone and wireless access points.

Associated with each access point is a geographic cell. Such cell is a geographic area in which an access point has sufficient signal strength to transmit data to and receive data from a mobile device such as a data terminal or telephone with an acceptable error rate. Typically, access points will be positioned along the backbone such that the combined cell area coverage from each access point provides full coverage of a building or site.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and an access point to which the mobile device is registered. As the mobile device roams from one cell to another, the mobile device will typically deregister with the access point of the previous cell and register with the access point associated with the new cell.

In order to provide sufficient cell area coverage, access points within the cellular communication system typically are distributed at separate physical locations throughout an entire building or set of buildings. For various reasons such as aesthetics, cell coverage, protection from the environment, etc., the access points typically are situated at locations hidden from view of the occupants and well removed from everyday traffic. Thus, it is not uncommon that access points are located above ceiling tiles or in other remote locations throughout the building or buildings.

At the same time, each access point must receive electrical power for operating the access point regardless of its particular physical location. In the past, it has been common practice to provide electrical power to each access point by installing a corresponding dedicated AC electrical power outlet (e.g., rated at 110 volts AC) in close physical proximity to each access point. Once installed, each access point is plugged into its dedicated AC outlet and receives operating power therefrom. Typically, the access point includes an AC-to-DC (AC/DC) converter which converts the power from the AC outlet to a suitable DC power level for operating the various electronics included within the access point.

Accordingly, the installation of a cellular communication system typically includes installation costs associated with adding an AC power line together with corresponding AC power outlets for each access point. Due to local electrical wiring codes, etc., each added outlet involves the cost of extra conduit and wiring needed to reach the location of the access point and the cost associated with hiring a licensed electrician to complete the work. Since the access points typically are located in difficult to reach locations (e.g., above ceiling tiles, etc.), installation of the AC wiring and conduit has been particularly time consuming for the electrician. As the number of access points required to serve a store or business is often large, the overall costs associated with supplying power to each access point has been high and adds significantly to the overall cost of installing a cellular communication system.

In view of the aforementioned shortcomings associated with the high installation costs for conventional cellular communication systems, there is a strong need in the art for a system which is less costly with respect to supplying power to access points within the system. In particular, there is a strong need in the art for a system which is both simple and inexpensive and does not require the high overhead associated with providing and installing dedicated AC power outlets.

SUMMARY OF THE INVENTION

The present invention provides for a cellular communication system which is not hampered by the aforementioned high costs and difficulties associated with providing electrical power to the access points. The cellular communication system of the present invention introduces a remote power source which obviates the need to install an AC power outlet in close proximity to each access point. The remote power source transforms AC power to DC power at a central remote location, and provides as its output one or more low voltage DC power lines. By performing the AC/DC power transformation at a central location, only the low voltage DC power lines need to be fed to each access point. Unlike AC power lines, low voltage DC power lines according to most local electrical codes are not required to be run through conduit and do not require installation by a licensed electrician. Furthermore, the DC power lines can simply be run along with other LAN wiring for the cellular communication network, thereby streamlining the entire power distribution and installation process. The remote power source of the present invention also includes a backup power supply feature and an alarm to draw attention to a system failure.

According to one particular aspect of the invention, a cellular communication system is provided. The system includes a system backbone, a host computer coupled to the system backbone, a plurality of access points coupled to the system backbone and distributed at different physical locations at least one mobile device for communicating on the system backbone via wireless communications with an access point selected among the plurality of access points, and a remote power source for providing power to the plurality of access points. The remote power source is located remotely from at least one of the plurality of access points and includes an AC/DC converter for converting AC power to DC power and for providing the DC power at an output, and at least one DC power line extending between the output of the AC/DC converter and respective power inputs of the plurality of access points.

In accordance with another aspect of the invention, a method for providing power to access points within a cellular communication system is presented. The method includes the steps of converting AC power to DC power at a location which is remote from the location of at least one of the access points and providing the DC power at an output, and providing the DC power at the output to respective power inputs of the plurality of access points using at least one DC power line.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
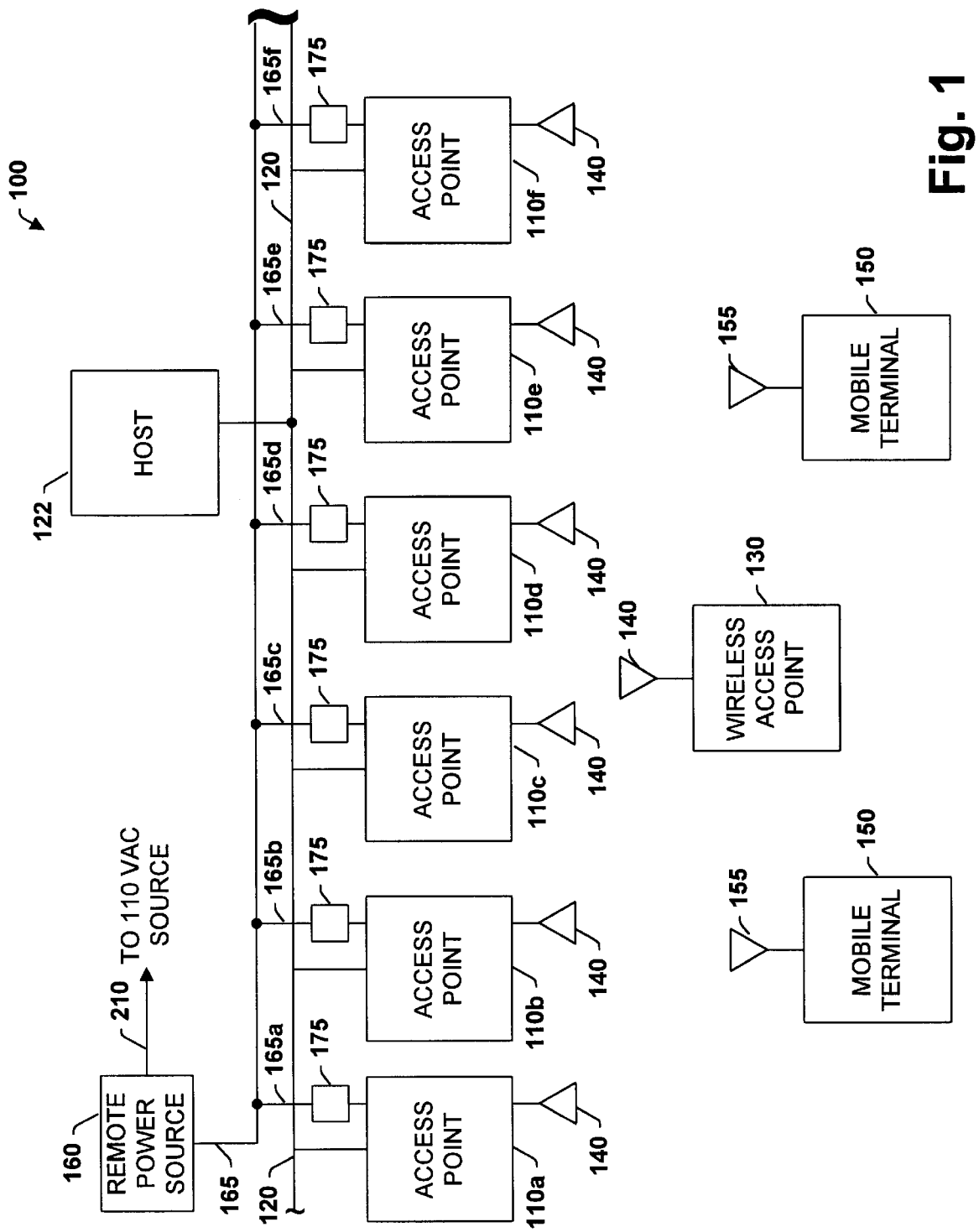
FIG. 1 is a block diagram of a cellular communication system including a remote power source in accordance with the present invention.

The present invention will now be described with reference to the drawings wherein like reference numerals are used to refer to like elements throughout. As mentioned above, the present invention relates to cellular communication systems which include mobile devices that can roam from cell to cell. Such mobile devices can be data terminals, telephones, pagers, etc. In the exemplary embodiment described hereinafter, the mobile device is a mobile data terminal (hereinafter "mobile terminal") used to communicate data such as inventory or the like. However, it is recognized that the invention contemplates other types of mobile devices and is not intended to be limited to systems utilizing mobile terminals.

Referring initially to FIG. 1, a cellular communication system 100 is shown in accordance with the exemplary embodiment of the present invention. The cellular communication system 100 includes a network having a system backbone 120. The system backbone 120 may be a hard-wired data communication path made of twisted pair cable, shielded coaxial cable or fiber optic cable, for example, or may be wireless in nature. Connected to the system backbone 120 are several access points 110a–110f (referred to generally as access points 110) and a host computer 122. Each access point 110a–110f includes a radio transceiver (not shown) and serves as an entrance point through which wireless communications may occur with devices on the system backbone 120. The access points 110 are distributed, for example, at different physical locations throughout a building (e.g., above ceiling tiles or the like). The system backbone 120 in the case of a hardwired data communication path may be a cable which is routed through walls and/or above the ceiling throughout the building. Since the system backbone carries only low level signals similar to those associated with most LAN based systems, the system backbone 120 need not be enclosed in conduit and/or comply with rigid local electrical codes.

In order to expand the effective communication range of the access points 110a–110f, one or more wireless access points 130 are also included in the cellular communication system 100. As is conventional, each wireless access point 130 associates itself, typically by registration, with another access point, whether hardwired or wireless, such that a link is formed between itself and other devices situated on the system backbone 120. Each access point 110,130 is capable of wirelessly communicating with other devices in the system 100 via an antenna 140. For instance, the antenna 140 may be an omni-directional, yagi-type or other form of antenna as will be readily appreciated.

The cellular communication system 100 also includes one or more mobile terminals 150. Each mobile terminal 150 includes its own radio transceiver (not shown) and communicates with devices on the system backbone 120 via a selected access point 110 and/or with other mobile terminals 150. Similar to the access points 110, 130, the mobile terminals 150 communicate via an antenna 155.

Except as otherwise described herein, the construction and operation of the access points 110,130 and the mobile terminals 150 is conventional. As a result, additional detail has been omitted for sake of brevity.

In order to supply operating power to each access point 110a–110f, the cellular communication system 100 also includes a remote power source 160. As is discussed in more detail below, the remote power source 160 serves to transform AC power to DC power prior to distribution to each access point 110, thereby allowing simpler and more cost efficient installation. Further, the remote power source 160 also includes backup power contingencies in the event of a failure within the power source. Low voltage DC power is distributed from the remote power source 160 to each access point 110a–110f via dedicated DC power lines 165a–165f (referred to collectively as power line 165). The dedicated power lines 165a–165f are fed into a power input for each corresponding access point 110 through a filter 175. The filter 175 is used to remove any line noise, interference or ripple effect which commonly occur in power transmission. Although not shown, a similar DC power line can be provided to the wireless access point(s) 130 for providing operating power thereto.

The remote power source 160 preferably is located at a central location such as in a utility room, closet, computer room, etc. at a building or site in which the system 100 is located. The remote power source includes a power cable 210 which is plugged into a 110-volt AC line source such as a conventional AC power outlet. The AC power from the line source is converted by the remote power source 160 into DC power output which is output on DC power lines 165a–165f.

Each of the DC power lines 165a–165f need only carry low voltage, low current power (e.g., 24 volts at 2.3 amperes) to provide for operation of the access points. Consequently, each DC power line 165a–165f can be an inexpensive two-conductor wire such as 18-gauge, plenum rated shielded cable or even conventional zip cord. The plenum rating is preferred as it allows the power lines 165a–165f to extend above ceiling tiles and in other locations while still meeting UL approved fire ratings. Because of the relatively low power levels associated with each DC power line 165a–165f, there is no need for the DC power lines 165a–165f to be enclosed in conduit in order to meet electrical code. Furthermore, because the two-conductor wire is generally flexible and easy to work with in much the same manner as the cable making up the system backbone 120, it is quite easy to route the power lines 165a–165f along the same run as the system backbone 120. Hence, installation is simplified and does not require the work of a licensed electrician.

According to the present invention, the access points 110a–110f, 130 need not include an AC/DC converter since DC power is provided directly to a power input of the access points which operate on DC power. In the exemplary embodiment, the access points 110a–110f are designed to operate based on a 24 volt DC supply and hence the power on the respective DC power line is at 24 volts. In an alternative embodiment, however, a DC-to-DC voltage converter can be included in the access point 110 to transform the DC voltage provided on the respective DC power line 165 to the appropriate DC level required by the access point 110 for operation.

Figure 2:
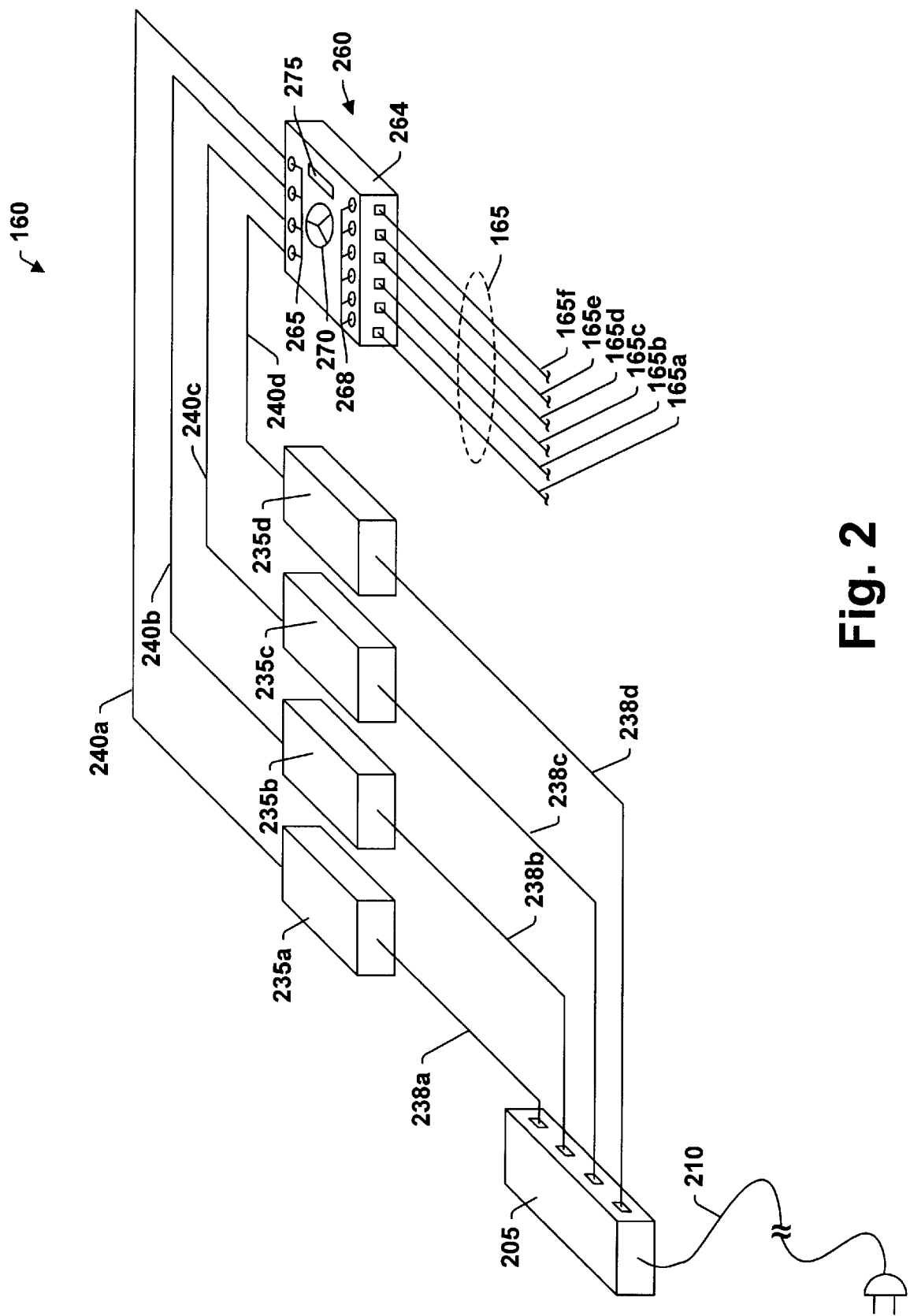
FIG. 2 is a block diagram of the remote power source in accordance with the present invention.

Referring now to FIG. 2, the remote power source 160 of the present invention is shown in more detail. As is shown, the remote power source 160 includes a multiple AC outlet power strip 205 which is supplied with standard 110 volt AC power (110 VAC) through the cable 210. The end of the cable 210 is connected to a standard wall outlet, an uninterruptable power supply, or other power source. The power strip 205 provides 110 VAC power from each of the respective outlets to each of four AC/DC converters 235a–235d via power cords 238a–238d, respectively. Each of the AC/DC converters 235a–235d is used to convert the standard 110 VAC power provided from the respective power cord into 24 volts DC (24 VDC) power at 2.3 amps. The DC power output from each converter 235a–235d is provided on lines 240a–240d, respectively. As is discussed in more detail below in relation to FIG. 3, the AC/DC converters 235a–235c are considered to be the primary transformers and are each capable of supplying sufficient DC operating power to two access points 110, while the AC/DC converter 235d is reserved as a backup power source in the event of a failure of one or more of the primary converters 235a–235c.

Figure 3:
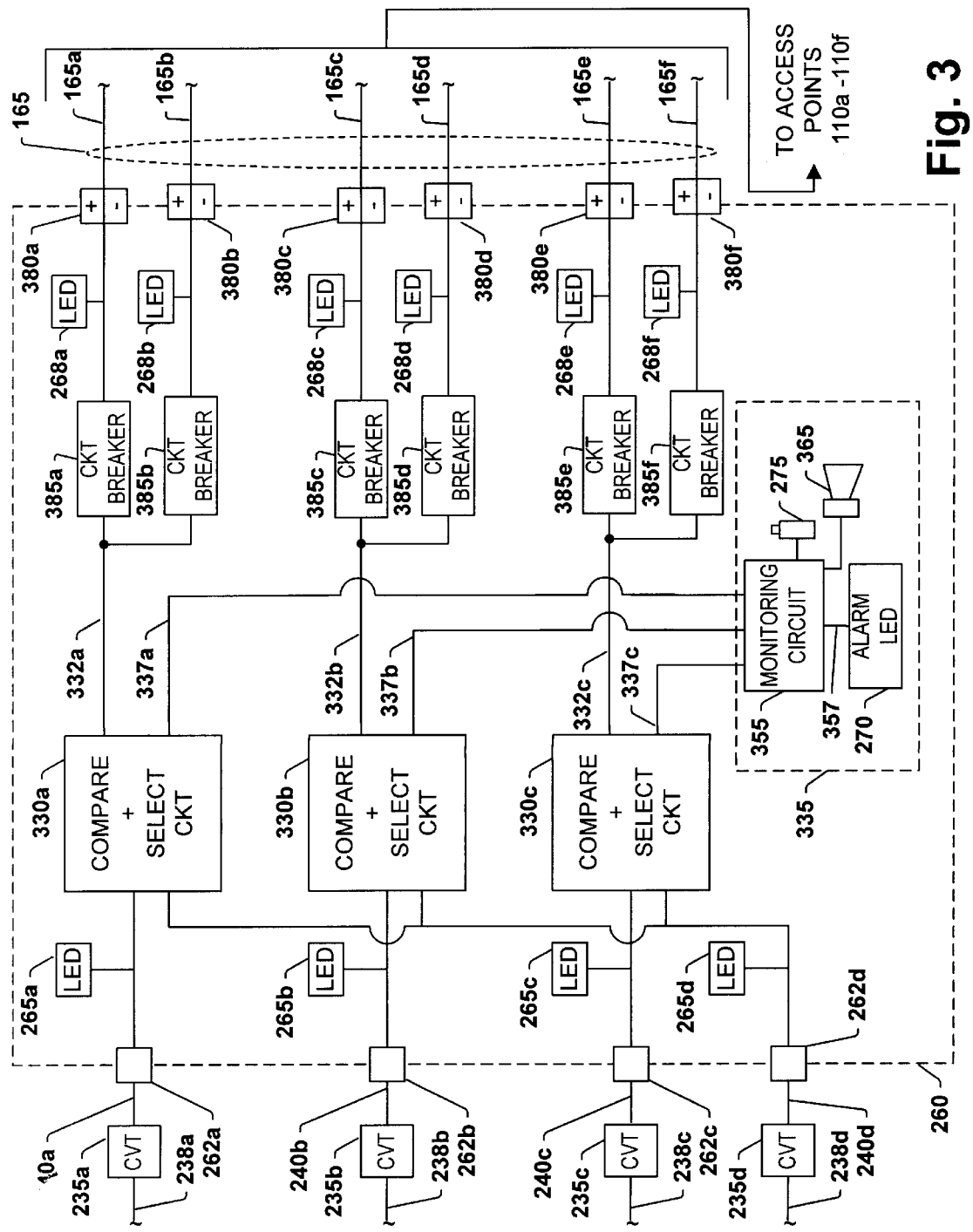
FIG. 3 is a detailed block diagram of a power control section included in the remote power source in accordance with the present invention.

Continuing to refer to FIG. 2, the output of each AC/DC converter on lines 240a–240d is coupled to a respective input of a power control section 260 via a corresponding connector 262a–262d (see FIG. 3). The power control section 260 contains power control circuitry for monitoring and selecting the outputs of the respective converters 235a–235d as is discussed in more detail below with respect to FIG. 3. The power control section 260 preferably includes a housing 264 which has several apertures through which "power side" light emitting diodes (LEDs) 265a–265d (collectively labeled 265) and "remote side" LEDs 268a–268f (collectively labelled 268) protrude such that they are visible to a user. Also visibly situated in the housing 264 is an alarm LED 270. The alarm LED 270 illuminates instances where power supplied from any of the primary AC/DC converters 235a–235c drops below a threshold output level. Further, an alarm silencer button 275 is also situated in the housing 264 to allow a user to turn off a warning buzzer 365 which is tripped in conjunction with the alarm LED 270. The dedicated DC power lines 165a–165f are connected to the output of the power control section 260 and, each line is connected directly to a power input of a corresponding access point 110 as discussed above in relation to FIG. 1.

Referring now to FIG. 3, a more detailed diagram of the power control section 260 is shown. The output of each primary AC/DC converter 235a–235c is coupled via the connectors 262a–262c to an input of a corresponding compare and select circuit 330a–330c, respectively. Additionally, the power side LEDs 265a–265c are each coupled to the outputs 240a–240c, respectively, via the connectors 262a–262c. The LEDs 265a–265c are configured so as to indicate whether a minimum threshold voltage (i.e. 6 VDC) is currently available through the associated output lines 240a–240c. More particularly, if power is available on the output line the LEDs 265a–265c will illuminate in green, while if the voltage on the respective output line falls below 6 VDC the respective LED will turn off. Note that in the event any particular converter 235a–235d fails, it may be disconnected from its respective connector 262a–262d and replaced eventually with a new converter.

The backup AC/DC converter 235d is provided in the remote power source 160 in the event of a failure of one or more of the primary AC/DC converters 235a–235c. More specifically, the output of the AC/DC converter 235d is connected in parallel to a second input of each of the compare and select circuits 330a–330c via the connector 262d. Utilizing the voltage level supplied on line 240d (or a predetermined fraction thereof) as the threshold level, each of the compare and select circuits 330a–330c compares the output voltage of the corresponding primary AC/DC converter 235a–235c with the voltage on line 240d to determine whether the primary AC/DC converter is supplying sufficient power to operate the access points 110 associated therewith.

In the event the output voltage from the primary AC/DC converter 235a–235c is equal to or greater than the voltage provided by the backup AC/DC converter 235d (or a predetermined fraction thereof), each compare and select circuit 330a–330c is designed to output power from the respective primary AC/DC converter onto a corresponding output line 332a–332c of the compare and select circuit 330a–330c. On the other hand, if the output voltage from the corresponding primary AC/DC converter is less than the voltage provided by the backup AC/DC converter 235d (or a predetermined fraction thereof), each compare and select circuit 330a–330c is designed to output power from the backup AC/DC converter 235d, onto corresponding output line 332a–332c. Thus, if one of the primary AC/DC converters 235a–235c fails the corresponding compare and select circuit 330a–330c will automatically switch over to power provided by the backup AC/DC converter 235d and provide such power as an output on corresponding output line 332a–332c. If more than one primary AC/DC converter 235a–235c fails, the power available from the backup AC/DC converter 235d is distributed among the outputs of the compare and select circuits 330a–330c corresponding to each of the failed primary AC/DC converters. For this reason, it is desirable that the backup AC/DC converter 235d have a power rating which is three times that of the converters 235a–235c.

As is discussed in more detail below, the power on each of the output lines 332a–332c is utilized to power a corresponding pair of access points 110. In the exemplary embodiment each output line 332a–332c is used to feed power to two access points connected in parallel, although it will be appreciated that virtually any other number of access points can be powered by a respective output line. The primary constraints as to the number of access points per output line is the power rating of the respective AC/DC converters.

Also coupled to each of the compare and select circuits 330a–330c is an alarm circuit 335. The alarm circuit 335 is used to provide both audio and visual indicators to a system operator in the event any of the primary AC/DC converters 235a–235c has an output power level which falls below the threshold represented by the output of the backup AC/DC converter 235d. More particularly, the compare and select circuits 330a–330c each provide a digital signal on lines 337a–337c, respectively, representing the result of the comparison between the power from the corresponding primary AC/DC converter 235a–235c and the backup threshold voltage provided by the backup AC/DC converter 235d. For example, the digital signals on lines 337a–337c change to an active level in the event the power from the backup AC/DC converter 235d exceeds that of the corresponding primary AC/DC converter. Each of lines 337a–337c is coupled to respective inputs of a monitoring circuit 355 which determines whether any of lines 337a–337c goes active indicating that backup power is needed. In the event backup power is needed by any of the primary AC/DC converters 235a–235c, the monitoring circuit 355 produces an output on line 357 which illuminates the alarm LED 270. Further, an alarm buzzer 365, coupled to the monitoring circuit 355, also is sounded via the monitoring circuit 355. The alarm LED 270 is configured to remain activated until backup power is no longer necessary. The alarm buzzer 365, however, is designed such that it may be reset at any time by depressing the silencer button 275 which is coupled to the monitoring circuit 355.

As shown in FIG. 3, each output line 332a–332c is split to supply power in parallel to two power connectors among power connectors 380a–380f. Each power connector 380a–380f includes positive (+) and negative (−) terminals for providing power from the corresponding output line 332a–332c to a corresponding one of the dedicated DC power lines 165a–165f connected thereto. In the exemplary embodiment, the power on output line 332a is coupled to DC power lines 165a and 165b via connectors 380a and 380b, respectively. Similarly, the power on output line 332b is coupled to DC power lines 165c and 165d via connectors 380c and 380d, respectively. Finally, the power on output line 332c is coupled to DC power lines 165e and 165f via connectors 380e and 380f, respectively. Based on the power requirements of the access points connected at the other ends of the DC power lines 165a–165f and the power rating of the AC/DC converters 235a–235d, the number of power terminals 380 supplied by each line 332 can vary as will be appreciated.

In order to protect against current surges and against fire hazards, circuit breakers 385a–385f are introduced between the output lines 332a–332c and each of the power connectors 380a–380f. Also coupled to the output of each circuit breaker 385 are the remote side LEDs 280a–280f. The remote side LEDs 280a–280f are configured to indicate whether the corresponding power connector 380a–380f is receiving power to operate an access point 110 connected thereto via the DC power line 165. As discussed above, it is possible, for instance, that one or more of the primary AC/DC converters 235a–235c has failed while power connectors 380a–380f still provide adequate power output due to the operation of the backup AC/DC converter 235d. Therefore, it is possible that all LEDs 280a–280f will remain illuminated even though one or more primary AC/DC converters have failed. The LEDs 280a–280f in combination with the LEDs 265a–265d provide a clear visual indication of such occurrence.

Accordingly, the present invention provides for a cellular communication system which is not hampered by the aforementioned high costs and difficulties associated with providing AC electrical power to each access point. Instead, the remote power source transforms AC power to DC power at a remote location, and provides as its output one or more low voltage DC power lines. By performing the AC/DC power transformation at a central location, only low voltage DC power lines need to be fed to each access point. Thus, the need and expense for strict adherence to local electrical codes and licensed electricians is avoided. Furthermore, the backup power supply and alarm avoid unnecessary shut down of the system and draw attention to malfunctioning connections.

Although the invention has been shown and described with respect to certain preferred embodiments, it is obvious that equivalents and modifications will occur to others skilled in the art upon the reading and understanding of the specification. For example, the exemplary embodiment has been discussed in the context of three primary AC/DC converters and one backup converter. However, it will be appreciated that various other combinations can be utilized depending on the output rating of the particular converters utilized, the power draw of the access points, the number of access points in the system, etc. In addition, each access point is provided with its own dedicated DC power line. In another embodiment two or more access points could be connected to the same DC power line in parallel as will be appreciated. The present invention includes all such equivalents and modifications, and is limited only by the scope of the following claims.

What is claimed is:

1. A cellular communication system, comprising:

a system backbone;

a host computer coupled to the system backbone;

a plurality of access points coupled to the system backbone and distributed at different physical locations;

at least one mobile device for communicating on the system backbone via wireless communications with an access point selected among the plurality of access points; and a remote power source for providing DC power to the plurality of access points, the remote power source being located remotely from at least one of the plurality of access points and including:

an AC/DC converter for converting AC power to DC power and for providing the DC power at an output, wherein the AC/DC converter comprises a primary AC/DC converter for providing the DC power at the output and a backup AC/DC converter for providing the DC power at the output in the event of an operational failure of the primary AC/DC converter; and at least one DC power line extending between the output of the AC/DC converter and respective power inputs of the plurality of access points.

2. The system of claim 1, wherein the remote power source includes separate DC power lines between the output of the AC/DC converter and each of the plurality of access points.

3. The system of claim 1, wherein the at least one DC power line comprises a plenum rated shielded cable.

4. The system of claim 1, wherein the remote power source includes a visual display for indicating provision of the DC power to the at least one DC power line.

5. The system of claim 1, wherein the at least one DC power line is substantially unencumbered by conduit.

6. The system of claim 1, wherein the at least one DC power line shares a common run with the system backbone.

7. The system of claim 1, wherein the at least one mobile device comprises a mobile terminal.

8. A cellular communication system, comprising:
   a system backbone;
   a host computer coupled to the system backbone;
   a plurality of access points coupled to the system backbone and distributed at different physical locations;
   at least one mobile device for communicating on the system backbone via wireless communications with an access point selected among the plurality of access points; and
   a remote power source for providing exclusively DC power to the plurality of access points, the remote power source being located remotely from at least one of the plurality of access points and including:
      an AC/DC converter for converting AC power to DC power and for providing the DC power at an output, wherein the AC/DC converter comprises a primary AC/DC converter for providing the DC power at the output and a backup AC/DC converter for providing the DC power at the output in the event of an operational failure of the primary AC/DC converter; and
      at least one DC power line extending between the output of the AC/DC converter and respective power inputs of the plurality of access points.

9. The system of claim 8, wherein the remote power source includes a visual display for indicating the failure of the primary AC/DC converter.

10. The system of claim 8, wherein the remote power source includes an audible indicator for indicating the failure of the primary AC/DC converter.

11. A cellular communication system, comprising:
   a system backbone;
   a host computer coupled to the system backbone;
   a plurality of access points coupled to the system backbone and distributed at different physical locations;
   at least one mobile device for communicating on the system backbone via wireless communications with an access point selected among the plurality of access points; and
   a remote power source for providing exclusively DC power to the plurality of access points, the remote power source being located remotely from at least one of the plurality of access points and including:
      an AC/DC converter for converting AC power to DC power and for providing the DC power at an output, wherein the AC/DC converter includes a plurality of primary AC/DC converters for providing the DC power at the output for respective ones of the plurality of access points, and at least one backup AC/DC converter for providing at least a portion of the DC power at the output in the event of an operational failure of one of the plurality of primary AC/DC converters; and
      at least one DC power line extending between the output of the AC/DC converter and respective power inputs of the plurality of access points.

12. The system of claim 11, wherein the remote power source includes a compare and select circuit for each of the primary AC/DC converters with each of the compare and select circuits having as inputs the output of the corresponding primary AC/DC converter and the output of the backup AC/DC converter, and each of the compare and select circuits functioning to output selectively one of its inputs to the output of the AC/DC converter.

13. In a cellular communication system comprising a system backbone, a host computer coupled to the system backbone, a plurality of access points coupled to the system backbone and distributed at different physical locations, and at least one mobile device for communicating on the system backbone via wireless communications with an access point selected among the plurality of access points, a method of providing DC power to the plurality of access points comprising the steps of:
   converting AC power to DC power at a location which is remote from the location of at least one of the access points and providing the DC power at an output, the converting step also including a step of using a primary AC/DC converter for providing the DC power at the output and a backup AC/DC converter for providing the DC power at the output in the event of an operational failure of the primary AC/DC converter; and
   providing the DC power at the output to respective power inputs of the plurality of access points using at least one DC power line.

14. The method of claim 13, wherein the step of providing the DC power includes the step of connecting separate DC power lines between the output and each of the plurality of access points.

15. The method of claim 13, wherein the at least one DC power line comprises a plenum rated shielded cable.

16. In a cellular communication system comprising a system backbone, a host computer coupled to the system backbone, a plurality of access points coupled to the system backbone and distributed at different physical locations, and at least one mobile device for communicating on the system backbone via wireless communications with an access point selected among the plurality of access points, a method of providing power to the plurality of access points comprising the steps of:
   converting AC power to DC power at a location which is remote from the location of at least one of the access points and providing the DC power at an output, the converting step also including a step of using a primary AC/DC converter for providing the DC power at the output and a backup AC/DC converter for providing the DC power at the output in the event of an operational failure of the primary AC/DC converter; and
   providing the DC power at the output to respective power inputs of the plurality of access points using at least one DC power line.

17. The method of claim 16, wherein the at least one DC power line is substantially unencumbered by conduit.

18. The method of claim 16, wherein the at least one DC power line shares a common run with the system backbone.

19. The method of claim 16, wherein the at least one mobile device comprises a mobile terminal.

* * * * *